Dec. 19, 1922.
A. J. MICHELIN.
BRAKE DRUM WHEEL.
FILED NOV. 5, 1920.
1,439,571.
2 SHEETS—SHEET 1.
Fig. 1.
Fig. 2.
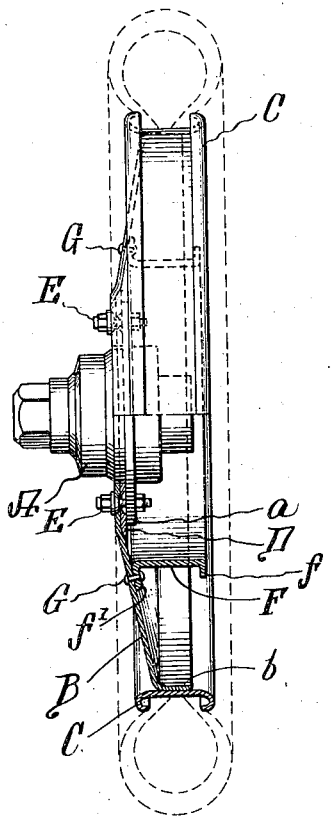
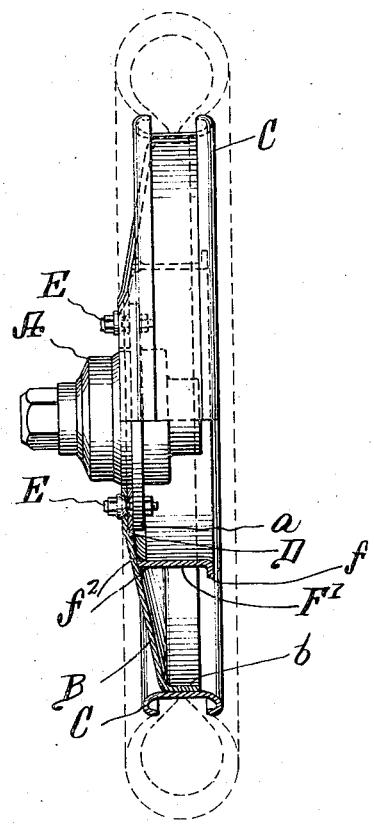
Inventor
André Jules Michelin
by Wilkinson + Giusta,
Attorneys.

Dec. 19, 1922.

A. J. MICHELIN.
BRAKE DRUM WHEEL.
FILED NOV. 5, 1920.

Inventor
André Jules Michelin
by Wilkinson & Giusta,
Attorneys.

Patented Dec. 19, 1922.

1,439,571

UNITED STATES PATENT OFFICE.

ANDRÉ JULES MICHELIN, OF PARIS, FRANCE.

BRAKE-DRUM WHEEL.

Application filed November 5, 1920. Serial No. 422,086.

*To all whom it may concern:*

Be it known that I, ANDRÉ JULES MICHELIN, a citizen of the French Republic, residing at Paris, France, have invented certain new and useful Improvements in Brake-Drum Wheels; and I do hereby declare the following to be a full, clear, and exact description of the invention, such as will enable others skilled in the art to which it appertains to make and use the same.

My present invention relates to improvements in brake drum wheels for automobiles, and is intended to provide a wheel combining all the features of the solid disk wheel with the brake drum attached to the disk and projecting inwardly therefrom, so that the disk portion of the wheel carries the brake drum.

This permits a reduction in the weight of the chassis, because of the simplification of the hubs of the wheels, and these latter may be made very much shorter.

Another advantage is that the pressure exerted on the wheel when the brake band is applied acts in substantially the same vertical plane with the force exerted by the wheel on the roadbed, instead of having the thrust in different vertical planes as heretofore, and at the same time decreasing the weight of the parts.

This disk arrangement also provides great accessibility of the brake attachments, since these are exposed when the wheel is removed. These advantages are particularly applicable to vehicles having brakes on all four wheels.

The invention is carried out by an addition or modification made in the metal wheels of the well known Michelin system, such, for instance, as are shown in my allowed application, Serial No. 386,325, filed May 21, 1919, and entitled Improvements in demountable wheels.

The wheel referred to comprises a dished disk rolled out of steel and having its edges flanged to serve as a seat of the rim, and in which the central portion is pierced to slip over the hub and is secured to a flange of the hub by bolts and nuts preferably having spherical bearings of the character fully described in my application aforesaid.

My invention will be more fully understood after reference to the accompanying drawings which show various modifications of the same general idea, and in which like parts are indicated by similar reference symbols throughout the several views, and in which:—

Figure 1 is an elevation of the metal portion of a disk wheel, the tire being shown in dotted lines, the hub being shown in elevation, and the disk and parts carried thereby being shown partly in section and partly in elevation. In this figure the drum is riveted to the disk.

Figure 2 is a similar view to Figure 1, except that the drum is shown as soldered, or welded to the disk.

Referring to the different figures in detail, A represents the hub of the wheel provided with a flange *a* to which the disk B is attached. This disk B is dished, as shown, and is flanged exteriorly, as at *b*, and is secured to the rim C in any convenient way, as by welding or the like. This rim C may be of any suitable shape, but as shown it is adapted to be used with beaded edge tires.

D represents an annular plate attached to the inner periphery of the disk B to reinforce the same and provide a suitable bearing for the bolts and nuts E, whose construction is fully described in my application aforesaid, and do not constitute a part of my present invention.

F represents a channeled ring provided with an inner flange or rib *f*, which serves the function of a guide for the brake band, and also stiffens the said ring. It is also provided with an outer flange *f'* which is secured to the disk B in any convenient way, as by means of the bolts or rivets G. The brake band, not shown, engages in the channeled portion of the exterior of the drum in the usual well known way. It is the purpose of this invention to use, as far as possible the old and well known brake bands, and my present invention relates more especially to the construction of the wheel.

In the modification shown in Figure 2, the parts are generally similar to those shown in Figure 1, except that the outer edge of the brake drum F' is soldered or welded to the disk B, as shown at *f²*.

Figure 3:
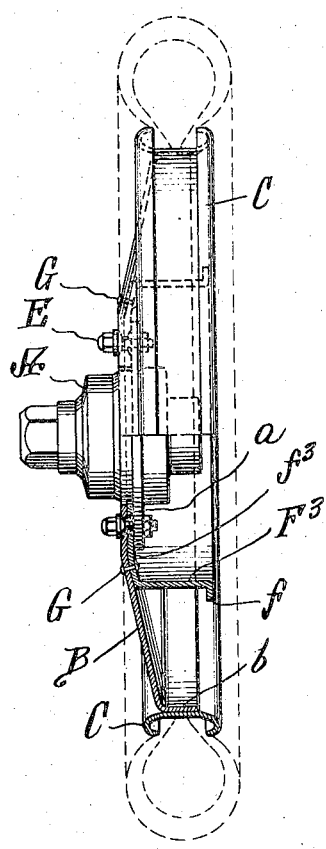
Figure 3 is a similar view to Figures 1 and 2, but shows another mode of attaching the drum.

In the modification shown in Figure 3, instead of having a separate reinforcing piece D, as shown in Figures 1 and 2, the brake drum F³ is flanged in towards the hub, as at f³, and forms a reinforce for the inner periphery of the disk B.

Figure 4:
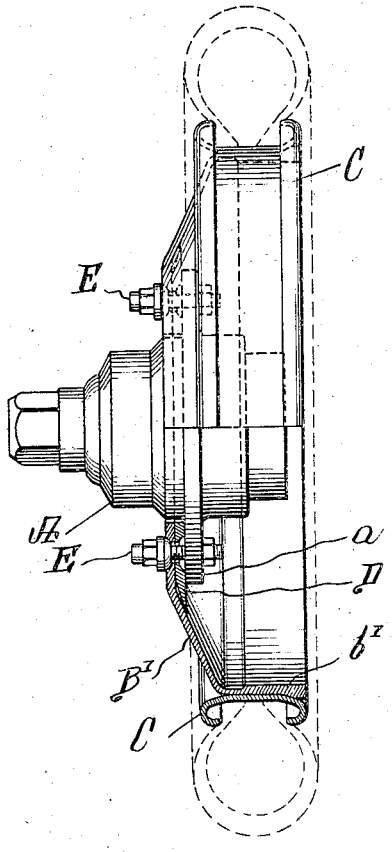
Figure 4 is a similar view to Figures 1 to 3, but shows the flange of the disk reinforced to provide a drum surface which is operated upon from the interior instead of from the exterior.

In the modification shown in Figure 4, a reinforcing plate D is provided similar to that already described with reference to Figures 1 and 2, and there is no separate brake drum connected to the wheel; but the flanged portion of the disk B' is thickened or reinforced as at b' and is provided on its interior with a cylindrical surface, which is adapted to engage a suitable brake, not shown, which brake is pressed outwards against this surface, or away from the axis of the wheel, whereas in the other modifications the brake band is pressed inwards or towards the axis of the wheel.

While I have described several modifications in which this general idea is carried out, it will be obvious that other modifications might be made in the construction, combination and arrangement of parts which could be used without departing from the spirit of my invention; and I do not mean to limit the invention to such details except as particularly pointed out in the claim.

Having thus described my invention what I claim and desire to secure by Letters Patent of the United States is:—

A wheel for automobiles, comprising a hub, a dished metal disk secured to said hub, a rim carried by said disk, and a brake drum in the form of a channeled plate secured to said disk and projecting inwardly from said dished disk and located between said hub and said rim, the inner edge of said drum lying within the plane of the inner edge of the rim.

ANDRÉ JULES MICHELIN.